United States Patent [19]

Nelson

[11] Patent Number: 5,115,934
[45] Date of Patent: May 26, 1992

[54] TAMPER RESISTANT CONTAINER LID

[75] Inventor: James L. Nelson, Temple City, Calif.

[73] Assignee: Highland Plastics, Inc., Pasadena, Calif.

[21] Appl. No.: 619,258

[22] Filed: Nov. 28, 1990

[51] Int. Cl.⁵ .............................................. B65D 17/40
[52] U.S. Cl. ................................. 220/276; 220/266; 220/269; 220/270; 215/252; 215/256
[58] Field of Search .............. 220/276, 270, 266, 269; 215/252, 256

[56] References Cited

U.S. PATENT DOCUMENTS

| | | | |
|---|---|---|---|
| 4,493,432 | 1/1985 | Smith | 220/276 X |
| 4,530,436 | 7/1985 | Wiedmer | 215/252 X |
| 4,682,706 | 7/1987 | De Vore et al. | 220/276 |
| 4,865,216 | 9/1989 | Landis | 220/270 |
| 4,981,230 | 1/1991 | Marshall et al. | 215/252 |

Primary Examiner—Stephen Marcus
Assistant Examiner—Paul A. Schwarz
Attorney, Agent, or Firm—David O'Reilly

[57] ABSTRACT

A tamper resistant container lid that provides a tear away strip that cannot be easily removed without evidence of tampering. The tear away strip is comprised of a plurality of tabs joined by integral thin film links that are heat contractible. With the lid mounted on a container and the tear strip folded or pressed down beneath the rim of the container heat applied to the strip will contract or collapse the thin film links securing the lid on the container. The thin film links are a secure method of providing evidence of tampering because the tear strip is nearly impossible to remove without rupturing one or more of these links. A second embodiment of the invention includes a latching mechanism to hold the tear strip in a closed or folded down position beneath the rim of a container while the thin film links are heated to secure the tear strip around the container. A molding apparatus and method is also described for manufacturing parts that require mold undercuts such as the latter tamper resistant lid. A spring biased stripper ring first pivots the portion of a part having indentations requiring undercuts away from the mold to release the undercut portion before ejecting the part from the mold.

11 Claims, 5 Drawing Sheets

TAMPER RESISTANT CONTAINER LID

FIELD OF THE INVENTION

This invention relates to tamper resistant container lids and more particularly relates to a tamper resistant container lid having a tear strip secured by integral heat contractible thin film links.

BACKGROUND OF THE INVENTION

In recent years because of package tampering many methods have been conceived to protect against tampering. The methods include products for sealing the container that will make the container tamper evident. That is, any tampering with the seals on the container will be apparent so that a potential user will be warned. While present methods have achieved some success, a disadvantage is that they are not as secured as they could be.

One such container has a plastic lid with sections that are easily ruptured to remove the lid. Any attempts to force the lid off the container will rupture these sections and provide evidence of tampering. However, this system can be defeated by a slow tedious prying of the lid a small section at a time, until the lid is removed without rupturing the tamper evident seal.

Another method of sealing containers is to provide a heat shrinkable plastic seal around the opening and over the cap. However, this system can be defeated by warming the heat shrinkable sleeve and slowly stretching it until it can be easily removed. It then can be replaced and heat shrinked back over the cover after the product in the package has been tampered with.

Another disadvantage of these products is that the more secure they are the more difficult it is to gain access to the container. For example, the latter container with the heat shrinkable sleeve is so secure that it sometimes requires a knife to cut them away. Users have been injured by stabbing or cutting themselves trying to remove the seal.

Another method of sealing containers is to provide a thin foil covering over the mouth of the container beneath the cap. This too, while effective, has its disadvantages. The sealed foil or film is covered by the lid loosing the visual effect of a secure package. Another difficulty with this type arrangement is that it also is difficult to remove and sometimes requires a cutting instrument to pierce the seal.

Thus it can be seen that while the present methods are effective they have disadvantages in that they can be defeated or if very secure they may be difficult to remove.

It is one purpose of the present invention to provide a tamper resistant lid for containers that is almost impregnable. In this container lid a tear strip is provided that is extremely difficult to remove without rupturing integral thin film links securing the lid on a container.

Yet another object of the present invention is to provide a container lid that has a tear strip that is very secure but is also very easy to remove by a user. The tear strip is secured to the lid container by a thin section of material providing a flexible hinge that will easily tear.

Yet another object of the present invention is to provide a tamper resistant container lid that is easy to open in that it has a tear strip and a pull tab that allows the strip to be easily stripped from the lid providing access to the container.

Still another object of the present invention is to provide a tamper resistant container lid that is secure, easy to open, and will provide a good secure closure after the tear strip has been removed.

Yet another object of the present invention is to provide a unique molding apparatus and method that allows products having indentations at right angles to the plane of the mold to be ejected from the mold.

Still another object of the present invention is to provide an apparatus and method of molding that includes a spring loaded auxiliary stripper ring to first deflect a contoured part that goes beyond the plane of the mold before ejecting the part from the mold.

BRIEF DESCRIPTION OF THE INVENTION

The purpose of the present invention is to provide a tamper resistant lid that is extremely secure but yet may be easily removed providing access to a container.

The purposes of the invention are achieved by providing a lid with a tear strip secured around the periphery of the lid to a flange which forms the annulus for mounting the lid on the rim of a container. The tear strip is secured to the edge of the flange of the lid by a thin section of material forming a hinge. The tear strip also includes a number of thin film links that will buckle or wrinkle when the tear strip is folded and pressed down around the periphery of a container rim. Heat can then be applied to the tear strip to cause the thin film links to contract or collapse securing the lid to the container. This provides a nearly impregnable seal because the strip cannot be pried lose without breaking one or more of these thin film links.

The tear strip also has a pull tab formed at the end so that it may easily grasped by the fingers and smoothly torn from the lid. The annulus in the flange of the lid fits a mating rim of a container and has a ridge that will allow the container lid to be used in a normal fashion.

The tear strip also includes a latching mechanism to hold the tear strip in a folded position around the rim of the container while the thin film links are heated. The latching mechanism in the form of bosses or ledges formed beneath the tear strip having a small notch that will catch on the lip of the container lid holding the tear strip in a folded position. Heat is then applied to the tear strip to contract the thin film links securing the lid to the container.

A unique molding apparatus and method have been designed to manufacture the flexible tear strip on the tamper resistant lid. Since the latching mechanism is in the form of a small notch formed on a boss beneath the tear strip an indentation beyond the plane of the mold must be machined. This makes it difficult to remove the part from the mold. Thus a mold has been designed which will first eject a section of the part that is not in the plane of the mold then allow the rest of the part to be ejected from the mold. To accomplish this purpose the mold design has a spring loaded stripper ring constructed and arranged to engage the flexible hinged tear strip of the lid deflecting it at a sufficient angle to eject the tear strip portion from the indentation in the mold allowing the rest of the part to be stripped from the mold.

The above and other novel features and advantages of the invention will be more fully understood from the following detailed description and the accompanying drawings in which:

DETAILED DESCRIPTION OF THE INVENTION

Figure 1:
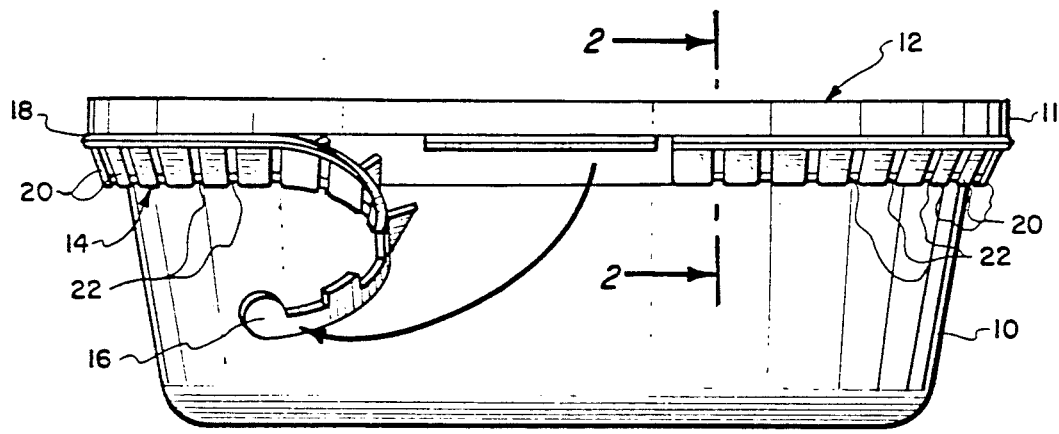
FIG. 1 is a side elevation of a container having a tamper resistant lid according to the invention.

A container 10 using tamper resistant lid 12 of the invention is illustrated in FIG. 1. Tamper resistant lid 12 has tear strip 14 that is easily removed by a lateral pulling force on pull tab 16. The tear strip 14 is formed on the lower edge of lip 11 of planar lid 12 with thin section 18 providing a hinge that will easily fracture when a moderate lateral force is applied to tab 16. Tear strip 14 is constructed of alternating tabs 20 joined by thin film links 22 as will be described in greater detail hereinafter. The arrangement shown provides an easily removed tear strip while at the same time providing a very secure tamper resistant lid. It solves the problem of providing a secure tamper resistant lid while allowing the container to be easily opened by a user.

Figure 2:
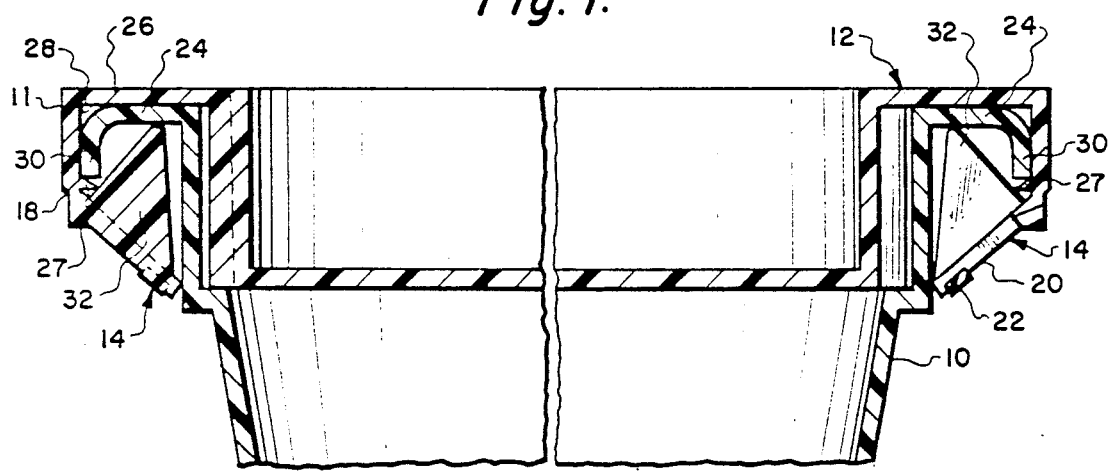
FIG. 2 is a section view taken at 2—2 of FIG. 1.

The sectional view of FIG. 2 illustrates the lid 12 secured to the container 10 by tear strip 14. Container 10 is a conventional container having a peripheral flange 24 for engaging flange 26 and annulus 28 on lid 12. Lid 12 is secured to container 10 by tear strip 14 folding beneath the flange 30 on rim 24 of the container. Tear strip 14 has bosses 32 which fit beneath the cavity formed by flange 30 securely clamping lid 12 on container 10.

Figure 3:
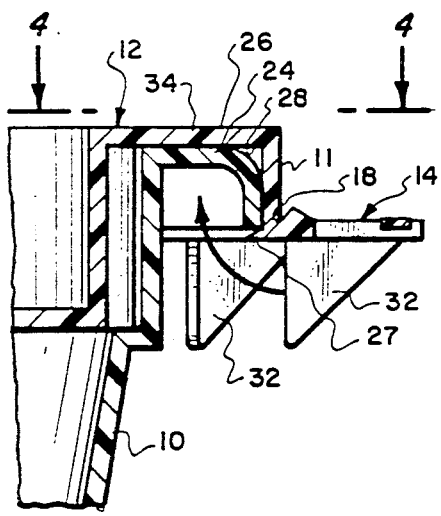
FIG. 3 is a deep partial section illustrating the securing of the tear strip.
Figure 4:
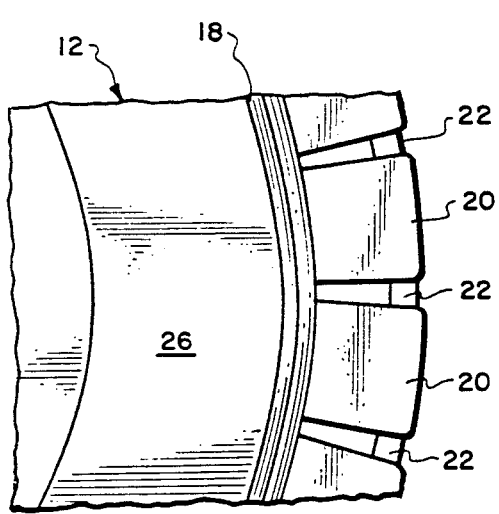
FIG. 4 is a partial sectional view taken at 4—4 of FIG. 3 illustrating the container with the tamper resistant lid having the tear strip in an unfolded position prior to securing it.

The construction and operation of the tear strip 14 is illustrated in FIGS. 3 through 7. FIG. 3 is a partial section showing lid 12 placed on a container 10 with tear strip 14 in an unfolded position. Flange 26 of lid 12 fits around rim 24 with annulus 28 fitting around rim 24 of container 10. Tear strip 14 is formed as shown in FIG. 4 of a plurality of tabs 20 joined by thin film links 22 and thin section 18 forming a flexible hinge allowing the tear strip to be folded down around rim 24 of container 10 as indicated by the arrow in FIG. 3.

Figure 5:
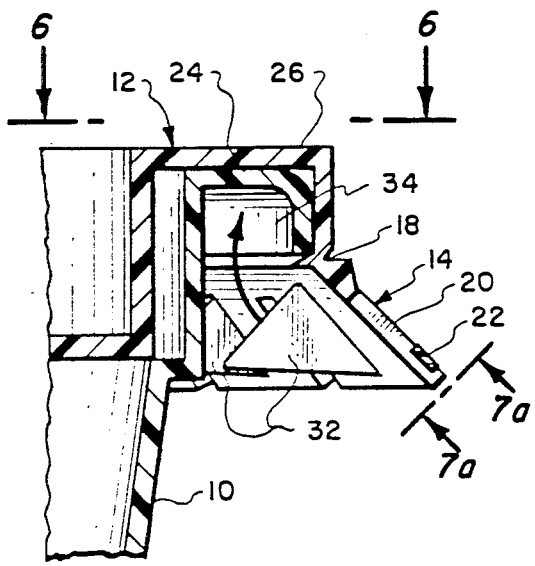
FIG. 5 is a partial sectional view illustrating another embodiment of the invention including a mechanism to hold the tear strip of the tamper resistant lid in a folded position.
Figure 6:
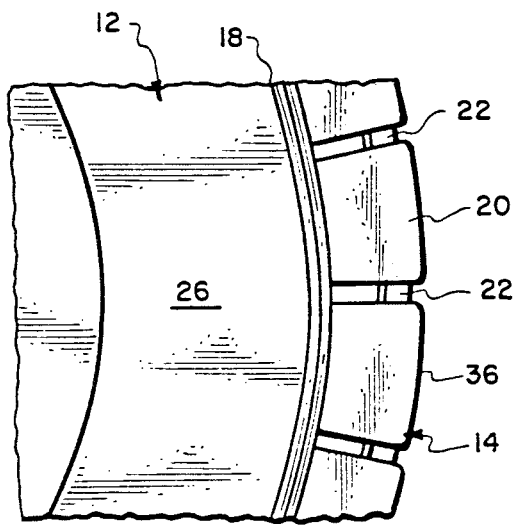
FIG. 6 is a partial sectional view taken at 6—6 of FIG. 5 of a tamper resistant lid with the tear strip and heat shrinkable thin film links.

To secure lid 12 after it is seated on rim 24 of container 10 tear strip 14 is folded down as illustrated in FIG. 5 until boss 32 rotates upward into channel 34 beneath rim 24 of container 10. Tear strip 14 is shown in its relaxed position in FIG. 6 with tabs 20 joined by thin film links 24 extending away from container 10. Thin section 18 acts as a hinge for the tear strip 14 allowing it to be folded down around the periphery of container 10.

Figure 7A:
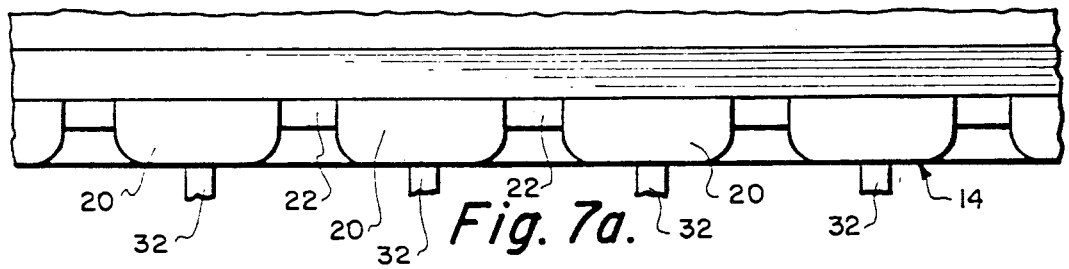
FIG. 7a is a view taken at 7a-7a of FIG. 5.
Figure 7B:
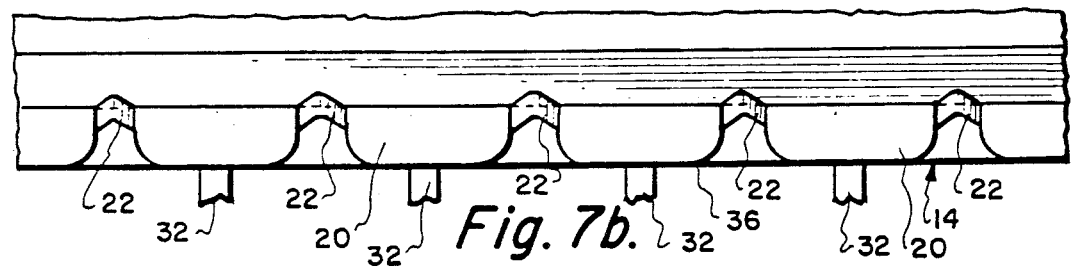
FIG. 7b and 7c are views illustrating the steps for securing the tamper resistant lid to a container.
Figure 7C:
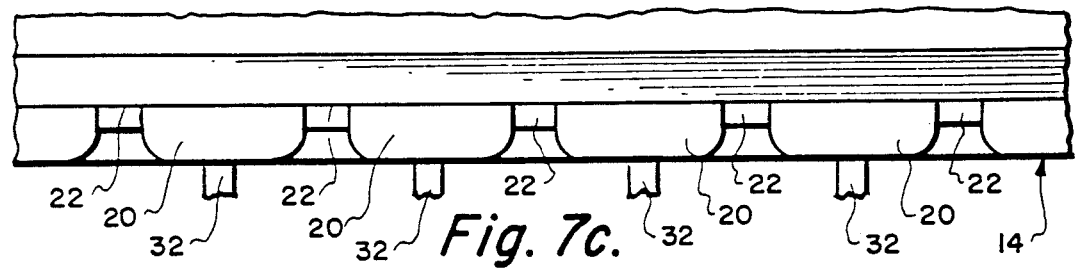

The function of tear strip 14 and of thin film links 22 is illustrated in FIG. 7a through 7c. In FIG. 7a tear strip 14 is in an unstressed, relaxes position with thin film links 22 joining adjacent tabs 20 in a fully extended position. Thin film links 22 are of the same material but substantially thinner than tabs 20 and preferably are less than half the thickness of adjacent tabs 20 forming tear strip 14. When tear strip 14 is stressed by being pressed or folded downward against the side of the container 10 the maximum diameter of 36 of tear strip 14 is reduced, which means that the overall diameter of tear strip 14 must conform to a smaller diameter. This contraction causes thin film links 22 to buckle or wrinkle as illustrated in FIG. 7b. Without something to hold tear strip 14 in its folded position it will tend to spring back out to the relaxed position of FIG. 6. To hold the tear strip in this position tear strip 14 is heated causing thin film links 22 to contract or collapse as illustrated in FIG. 7c until tear strip 14 is bound in a folded position beneath the rim of the cup as illustrated in FIG. 1. This arrangement securely clamps the lid 12 on container 10 and substantially prevents removal of the lid without some evidence of tampering. Attempts to remove or pry tear strip 14 away from the side of the container and beneath the rim of the cup is difficult and nearly impossible without rupturing one or more of thin film links 22.

Because the design of tear strip 14 involves alternating thick (tabs 20) and thin (links 22) sections only the thin sections will contract or collapse when heat is applied to this area leaving the thicker tabs 20 intact. This creates a new outer dimension of tear strip 20 after it has cooled.

However, while tear strip 14 makes lid 12 very secure against tampering it is not difficult for a user to remove. A lateral pulling force on tab 16 easily removes tear strip along section 18 forming the tear strip hinge. Pulling on tab 16 strips the tear strip away at the thin section 18 forming the hinge leaving the lid securely on the container. The lid may now be removed and replaced on the container and is held in place by ridge 27 in annulus 28 beneath lip 11 on flange 28 of lid 10.

An alternate embodiment is illustrated in FIGS. 8 through 11 which includes a latch mechanism to hold the tear strip in a folded down position around the periphery of the lid and container while the thin film links are being heated. This eliminates an extra labor step of holding the tear strip 14 of the embodiment of FIG. 1 down around the periphery of the container while the strip is being heated.

Figure 9:
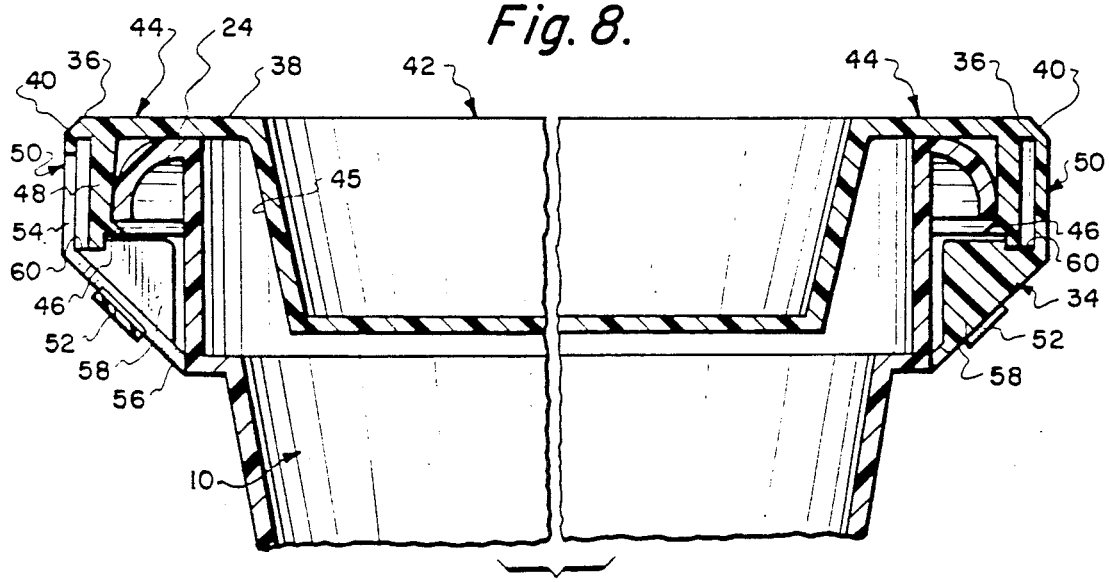
FIG. 9 is a sectional view taken at 9—9 of FIG. 8.

In the later embodiment tear strip 34 is secured to the upper edge 36 of lid 38 by thin section 40 forming a flexible hinge as can be seen in greater detail in the sectional view of FIG. 9. Lid 42 is substantially the same as the lid in the previous embodiment except that the tear strip is secured by hinge 40 to the upper edge 36 on flange 44 of lid 42. Flange 44 forms an annulus 45 which mates with rim 24 of container 10 and is held in place after tear strip 34 is removed by ridge 46 on lip 48 of flange 44.

Figure 8:
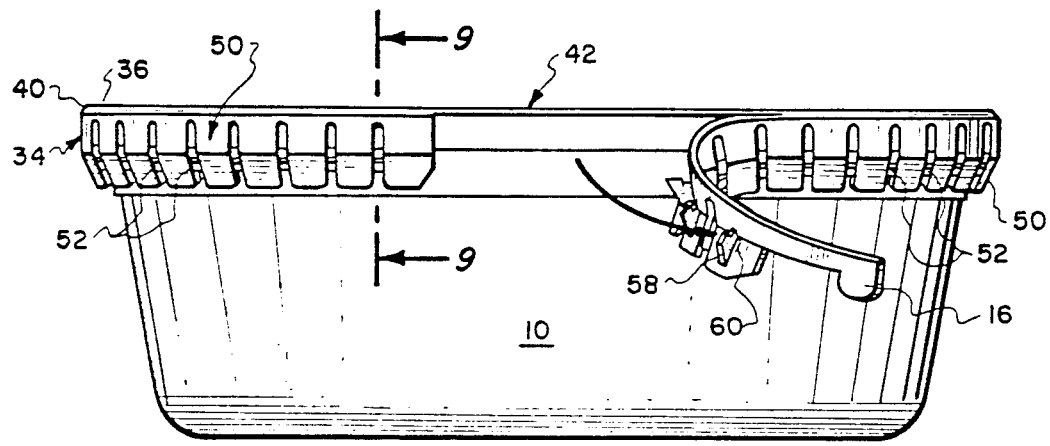
FIG. 8 is a side elevation of a container having an alternate embodiment of the tamper resistant lid of FIG. 1.

Tear strip 34 of this embodiment is unique because it includes structure to hold the tear strip folded down around the periphery of container 10 and lid 42. Tear strip 34 of this embodiment has bent tabs 50 joined by thin film links 52. The bent tabs 50 have a vertical section 54 and an angled section 56 that fits beneath the flange 44 and lip 48 of lid 42 when tear strip 34 is folded down around the periphery of the lid. Bosses or lugs 58 are provided beneath each tab 50 as before except that lugs 58 are provided with a notch 60 that is constructed to catch the lower edge of lip 48 on flange 44. In this manner tear strip 34 is held in a folded down position as shown in FIG. 8 prior to heating the tear strip to contract thin film links 52 between adjacent tabs 50.

Figure 10:
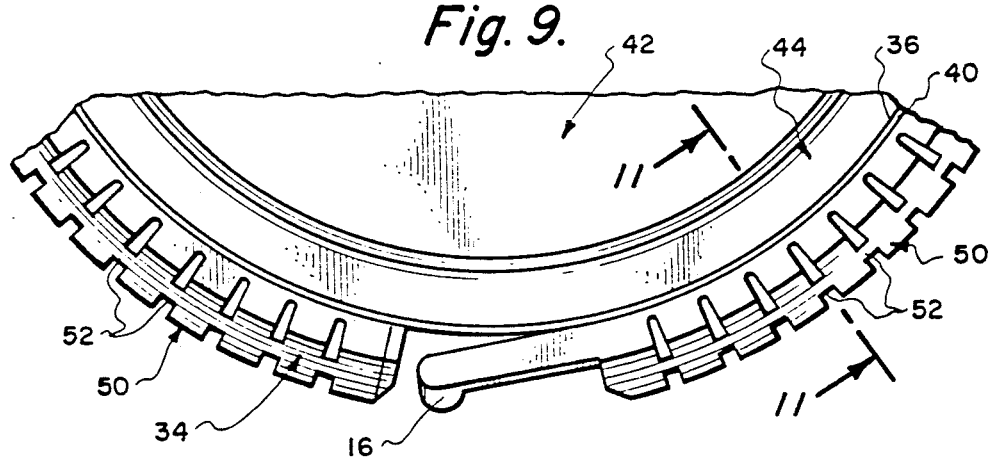
FIG. 10 is a partial sectional view illustrating a tamper resistant lid before the tear strip has been secured to the container.

Lid 42 is shown prior to installing it on a container 10 in a partial top view of FIG. 10. Bent tabs 50 are each joined by thin film links 52 that lie flat when tear strip 34 is in its relaxed, stretched out position. As before thin film links 52 are of the same material but substantially thinner than tabs 50. The tear strip 34 as described previously, is joined to the upper edge 36 of flange 44 by a thin strip of material 40 forming a flexible hinge for tear strip 34.

Figure 11:
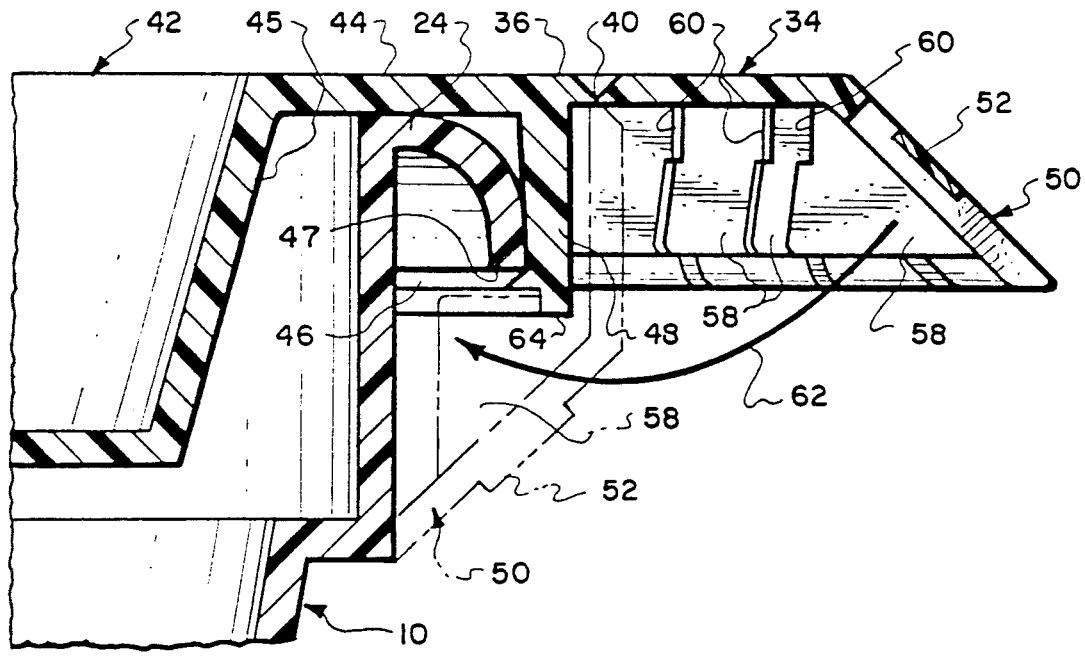
FIG. 11 is an enlarged partial section taken at 11—11 of FIG. 10 illustrating the latching of the tear strip prior to securing the lid to a container.

The installation of the lid 42 on container 10 is shown in the enlarged partial section of FIG. 11. Lid 42 is pressed down around rim 24 of container 10 until ridge 46 passes over and catches beneath the edge 47 of flange 24. Tear strip 34 is then pressed downward as indicated by arrow 62 until notch or catch 60 in lug 58 catches the edge 64 of lip 48 on lid 42 with the bent portion of tabs 50 beneath the rim of container 10. When tear strip 34 is folded down (i.e. closed) as shown in FIG. 11 thin film links 52 will buckle or wrinkle as illustrated in FIG. 7b. Heating the thin film links will cause them to contract or collapse until they are flush with the surface of tabs 50 securely locking lid 42 on container 10.

A lid secured to container 10 as described is nearly impregnable and will show clear evidence of tampering if any attempt is made to pry the tear strip 30 from beneath the flange on the container. The thin film links will easily rupture if any attempt is made to pry tabs 50 away from the container. However, the tear strip is easily removed by grasping tab 16 on the end of the tear strip and tearing the strip at the hinge 40 removing it from the lid. The lid now may be easily removed and replaced and is held in place by ridge 46 beneath the flange 44 of the lid.

Figure 12:
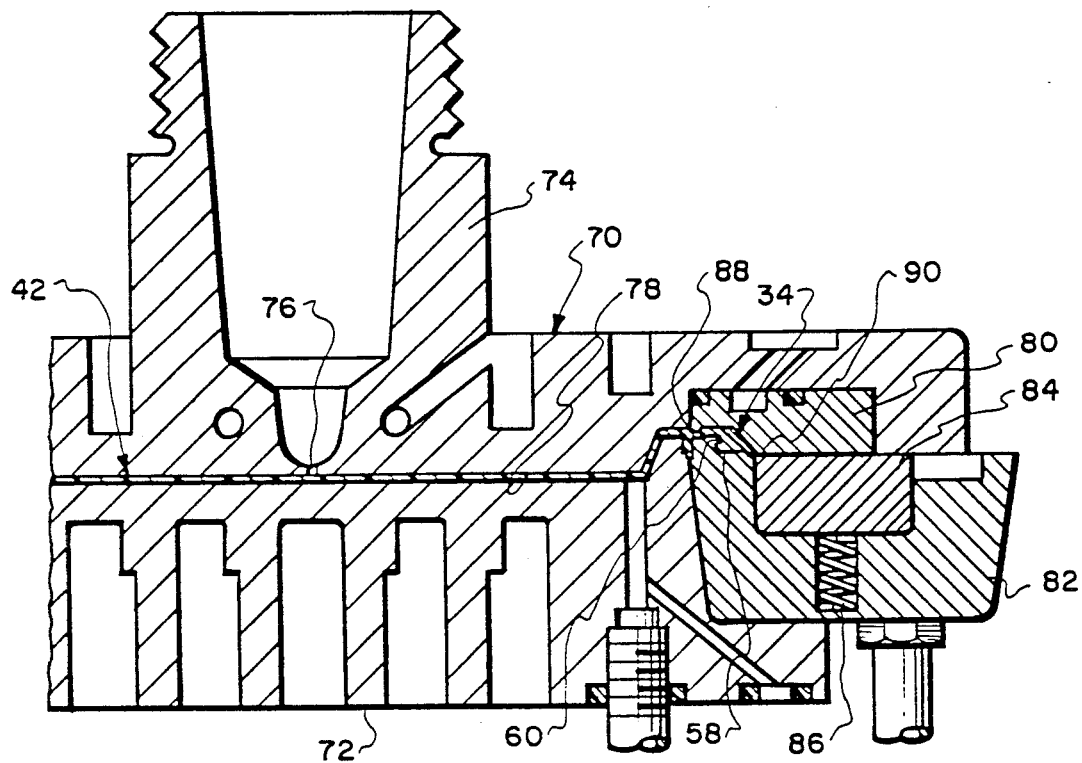
FIG. 12 is a partial section of a mold for manufacturing the tamper resistant lid of the present invention.
Figure 13:
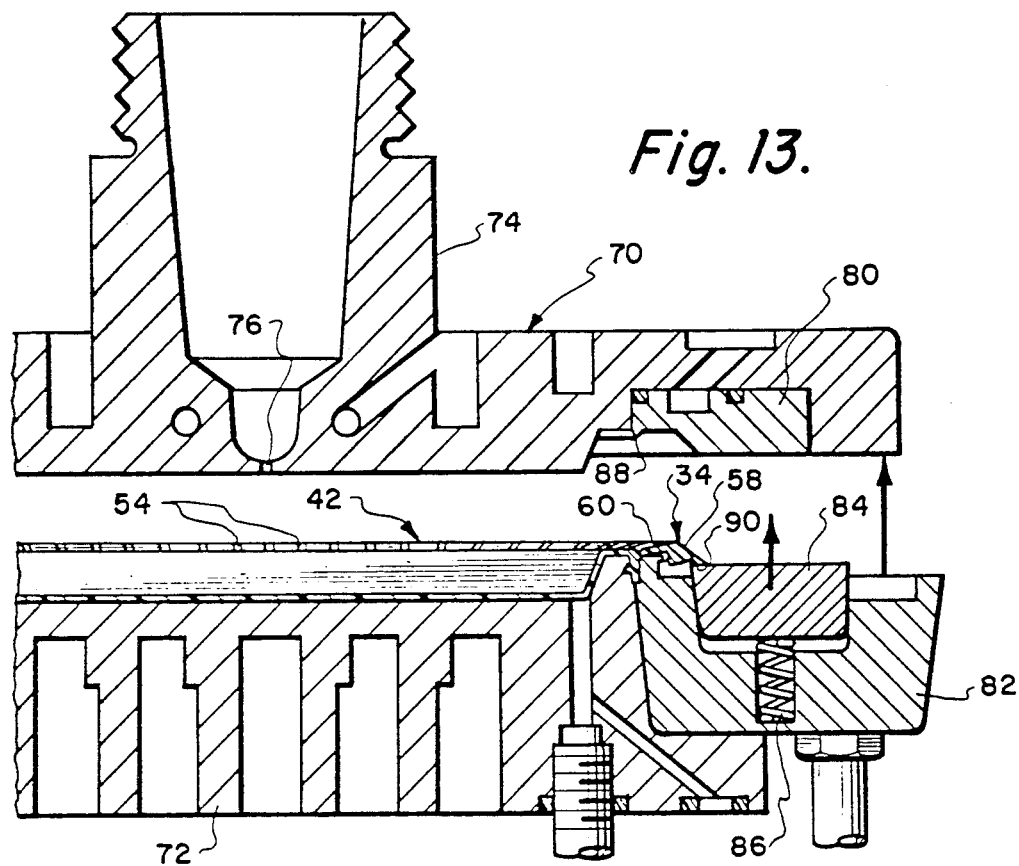
FIG. 13 is a partial section of a mold illustrating the pre-ejection of a portion of a part.
Figure 14:
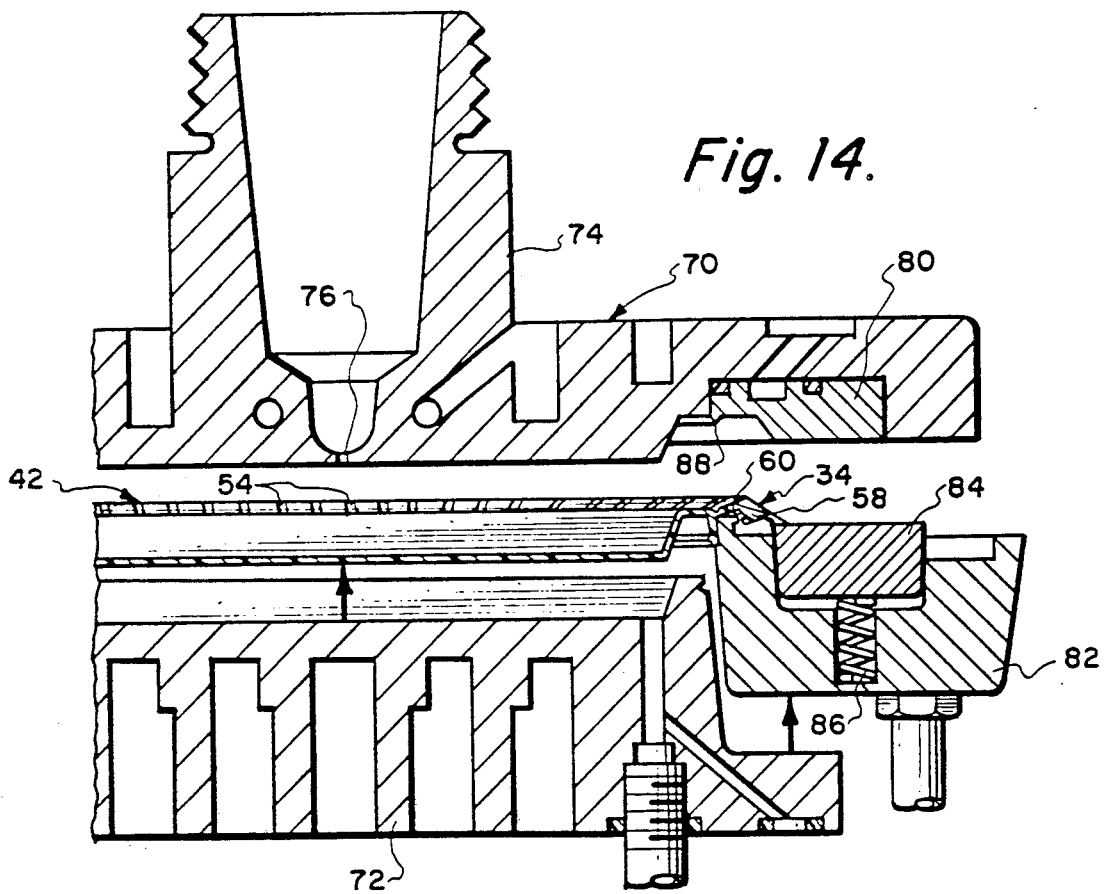
FIG. 14 is a sectional view illustrating the full ejection of a part after the pre-ejection of FIG. 13.

A unique molding apparatus and method has been developed to manufacture the tamper resistant lid according to the invention and is illustrated in FIGS. 12 through 14. Mold 70 is comprised of a core 72 and cavity section 74 having a gate 76 for introducing material into the void 78 in the mold for forming the part. The mold also includes a machined insert 80 mating with main stripper ring 82 and auxiliary spring loaded stripper ring 84. Spring 86 providing a thrust behind spring loaded stripper ring 84 for purposes which will be described in greater detail hereinafter.

This mold has been designed because of the difficulty of manufacturing parts that have any depressions or pockets that are beyond the plane of the void 78 in the mold. In the case of the lid disclosed and described with the respective FIGS. 8 through 11 tear strip 34 is formed with a lug or boss 58 and a notch 60 requiring an indentation or pocket in the mold. Parts with these kinds of configurations are difficult to remove from the mold. However with the spring loaded stripper ring of 84 this part once molded can be removed from the mold as illustrated in FIGS. 13 and 14.

To mold a part such as lid 42 material is forced in void 78 through gate 76 until material fills the void up to restriction 88 that forms the thin hinge section 40 of lid 42. When the pressure reaches a predetermined point cavity 74 will begin to separate from core 72 which will allow material to surge through restriction 88 into the remaining void of the mold forming tear strip 34. At this point in time the cavity 74 momentarily moves away from core 72 and material surges through restriction 88 into the void forming tear strip 34 and then again closes. After the material has cured mold cavity 74 begins to move away from core 72 and spring loaded stripper ring 84 having a corner 90 constructed to catch the edge of tear strip 34 causes the tear strip to flex or pivot backward releasing lug 58 from the pocket in the mold. This clears the lug from the indentation in the mold allowing main stripper ring 82 to strip the part from the mold completely. The part or lid 42 drops from the mold and the mold closes ready to manufacture another part. Thus the mold illustrated in FIGS. 12 through 14 provides a unique method and structure for manufacturing parts having pockets or fingers that are undercut or indented in the mold beyond the usual plane or surface of the mold.

Thus there has been disclosed a novel tamper resistant lid for containers that has a heat contractible links that once installed are difficult to remove without evidence of tampering. In one embodiment the tear strip is on the bottom edge of the flange of the lid and is held in place while the thin film links are heated to contract and secure the lid on the container. In a second embodiment the tear strip includes a latching mechanism in the form of a notch in lugs between tabs on the tear strip that catch the underside of the flange of the lid and hold the tear strip in place while the thin film links are contracted by heating. This secures the lid on the container and prevents removal without some evidence of tampering. Also described is a novel mold apparatus and method utilizing a spring loaded stripper ring to first strip a part having sections which fit pockets, indentation, or undercuts in the mold which are beyond the normal plane of the mold prior to stripping a completed part from the mold.

This invention is not to be limited by the embodiment shown in the drawings and described in the description which is given by way of example and not of limitation but only in accordance with the scope of the appended claims.

What is claimed is:

1. A tamper resistant lid for a container comprising;
    a lid having a peripheral flange forming an annulus for fitting the rim of a container
    a tear strip secured to the periphery of said flange by a thin section of material forming a hinge; said tear strip comprising;
    a plurality of spaced apart tabs;
    a plurality of thin sections joining said tabs, said thin sections constructed to lie within the plane of said tabs when said tear strip is unstressed and to bend outward when said tear strip is in a stressed condition folded down around the periphery of said lid, said thin sections being of a material that conforms to the plane of said tabs when heated; whereby said thin sections secure said tear strip by conforming to securely hold said lid on said container.

2. The lid according to claim 1 in which said tear strip is formed in a circular configuration substantially parallel to the plane of said lid; whereby said thin section forming said hinge is stressed when said tear strip is folded down around said lid.

3. The lid according to claim 1 in which said tear strip extends around the periphery of said lid and terminates in a pull tab, whereby said pull tab may be grasped by fingers and easily stripped from said lid.

4. The lid according to claim 3 including a ridge around the interior of said annulus for holding said lid on a container when said tear strip has been removed.

5. The lid according to claim 1 including means for locking said strip in a folded position before heating said thin film links.

6. The lid according to claim 5 in which said locking means comprises boss formed on the inside surface of said tear strip; said boss including a notch constructed and for engaging the rim of said container when said tear strip is pressed down; whereby said tear strip is locked and held in a folded position.

7. The lid according to claim 6 in which said boss is formed on the inside surface of each tab formed on said tear strip.

8. A tamper resistant lid for containers comprising:

a lid having a peripheral flange forming an annulus for fitting the rim of a container;

a tear strip secured to the periphery of said flange by a thin section of material forming a hinge;

said tear strip being formed of a plurality of tabs each joined by conformable thin film links constructed and arranged to wrinkle when said tear strip is pressed down around the rim of a container and conform when heated;

locking means for locking said tear strip in a folded position before heating said thin film links, said locking means comprising:

a boss formed on the inside surface of said tear strip, said boss including a notch constructed and for engaging the rim of said container when said tear strip is pressed down;

whereby said conformable thin film links protect a lid against tampering by easily rupturing if said lid is tampered with.

9. The lid according to claim 8 in which said tear strip extends around the periphery of said lid and terminates in a pull tab, whereby said pull tab may be grasped by the fingers to easily remove said tear strip from said lid.

10. The lid according to claim 9 including a ridge around the interior of said annulus for holding said lid on a container when said tear strip has been removed.

11. The lid according to claim 8 in which said boss is formed on the inside surface of each tab formed on said tear strip.

* * * * *